US012607712B1

(12) United States Patent
Alferdaous Alazem et al.

(10) Patent No.: US 12,607,712 B1
(45) Date of Patent: Apr. 21, 2026

(54) SYSTEMS AND METHODS FOR DETECTING FALSE POSITIVE SENSOR DATA

(71) Applicant: Zoox, Inc., Foster City, CA (US)

(72) Inventors: Badeea Ferdaous Alferdaous Alazem, Redwood City, CA (US); Amir Azemati, Encino, CA (US); Gargi Prashant Ratnaparkhi, Belmont, CA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 360 days.

(21) Appl. No.: 18/541,446

(22) Filed: Dec. 15, 2023

(51) Int. Cl.
| | |
|---|---|
| *G01S 7/292* | (2006.01) |
| *B60W 30/09* | (2012.01) |
| *B60W 60/00* | (2020.01) |
| *G01S 7/41* | (2006.01) |
| *G01S 13/931* | (2020.01) |

(52) U.S. Cl.
CPC ........... *G01S 7/2927* (2013.01); *B60W 30/09* (2013.01); *B60W 60/001* (2020.02); *G01S 7/412* (2013.01); *G01S 13/931* (2013.01); *B60W 2420/408* (2024.01); *G01S 2013/9323* (2020.01)

(58) Field of Classification Search
CPC ........ G01S 7/292; G01S 7/2927; G01S 7/412; G01S 13/931; G01S 2013/9323; B60W 60/001; B60W 30/09; B60W 2420/408
See application file for complete search history.

(56) References Cited

U.S. PATENT DOCUMENTS

| | | | | |
|---|---|---|---|---|
| 10,649,459 | B2 * | 5/2020 | Wang | G06T 7/11 |
| 12,436,261 | B1 * | 10/2025 | Srivastav | G01S 7/023 |
| 2008/0266169 | A1 * | 10/2008 | Akita | G01S 13/931 |
| | | | | 342/117 |
| 2021/0165932 | A1 * | 6/2021 | Mohan | G06F 11/3698 |
| 2021/0303875 | A1 * | 9/2021 | Bangalore Ramaiah | |
| | | | | G06V 20/58 |
| 2021/0354717 | A1 * | 11/2021 | Sakamoto | B60W 40/09 |
| 2022/0055664 | A1 * | 2/2022 | Koopman, Jr. | G08G 1/166 |
| 2023/0003871 | A1 * | 1/2023 | Qian | G06N 20/00 |
| 2023/0031972 | A1 * | 2/2023 | Stellet | B60W 50/14 |
| 2023/0103178 | A1 * | 3/2023 | Li | G01S 7/295 |
| | | | | 701/23 |
| 2023/0184887 | A1 * | 6/2023 | Hagvall | G06V 20/58 |
| | | | | 73/1.01 |
| 2023/0419681 | A1 * | 12/2023 | Cheng | G01S 7/412 |
| 2024/0416929 | A1 * | 12/2024 | Romero | B60W 50/0097 |
| 2025/0086452 | A1 * | 3/2025 | Raichelgauz | G06N 3/045 |

* cited by examiner

*Primary Examiner* — Peter M Bythrow
(74) *Attorney, Agent, or Firm* — Lee & Hayes, P.C.

(57) ABSTRACT

Techniques for determining false positive detections in sensor data to remove such data from use in vehicle control operations are described. For an individual sensor detection, the system determines whether a difference between primary and secondary error values for one or more measurements is sufficient and, if so, the sensor detection is considered a true positive. If the error difference is insufficient, the system determines if the sensor detection correlates with a sufficient number of true positive sensor detections, and if so, the sensor detection is designated a true positive. If not, the sensor detection is a false positive and is removed from use in further operations, such as vehicle control operations.

20 Claims, 5 Drawing Sheets

Figure 2:
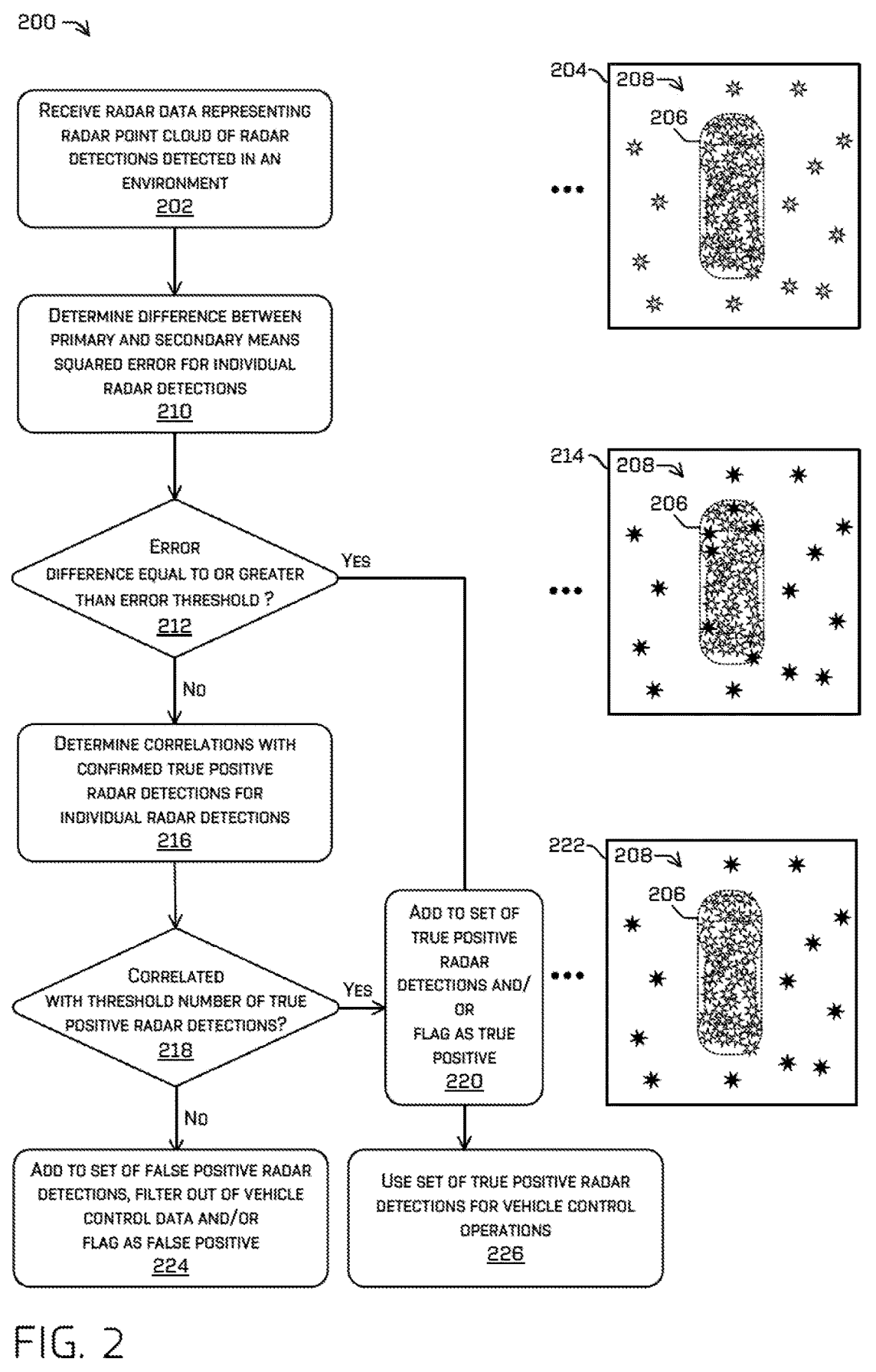

200

RECEIVE RADAR DATA REPRESENTING
RADAR POINT CLOUD OF RADAR
DETECTIONS DETECTED IN AN
ENVIRONMENT
202

DETERMINE DIFFERENCE BETWEEN
PRIMARY AND SECONDARY MEANS
SQUARED ERROR FOR INDIVIDUAL
RADAR DETECTIONS
210

ERROR
DIFFERENCE EQUAL TO OR GREATER
THAN ERROR THRESHOLD ?
212

YES

No

DETERMINE CORRELATIONS WITH
CONFIRMED TRUE POSITIVE
RADAR DETECTIONS FOR
INDIVIDUAL RADAR DETECTIONS
216

CORRELATED
WITH THRESHOLD NUMBER OF TRUE
POSITIVE RADAR DETECTIONS?
218

YES

No

ADD TO SET OF
TRUE POSITIVE
RADAR
DETECTIONS AND/
OR
FLAG AS TRUE
POSITIVE
220

ADD TO SET OF FALSE POSITIVE RADAR
DETECTIONS, FILTER OUT OF VEHICLE
CONTROL DATA AND/OR
FLAG AS FALSE POSITIVE
224

USE SET OF TRUE POSITIVE RADAR
DETECTIONS FOR VEHICLE CONTROL
OPERATIONS
226

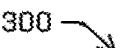

300

VEHICLE COMPUTING SYSTEM 302

SENSOR SYSTEM(S)
304

RADAR FALSE POSITIVE
DETERMINATION COMPONENT
306

RADAR ERROR DIFFERENCE
DETERMINATION COMPONENT
308

RADAR CORRELATION
DETERMINATION COMPONENT
310

LIDAR FALSE POSITIVE
DETERMINATION COMPONENT
312

LIDAR ERROR DIFFERENCE
DETERMINATION COMPONENT
314

LIDAR CORRELATION
DETERMINATION COMPONENT
316

MAPPING COMPONENT
328

VEHICLE
CONTROL
COMPONENT(S)
326

PREDICTION
COMPONENT
324

PLANNING
COMPONENT
322

PERCEPTION
COMPONENT
318

FUSION COMPONENT
320

SYSTEMS AND METHODS FOR DETECTING FALSE POSITIVE SENSOR DATA

BACKGROUND

Various systems, including autonomous vehicles, utilize radar, lidar, and other forms of sensor systems to emit pulses of electromagnetic waves (e.g., radio waves, laser pulses, etc.) into an environment and detect pulses that are reflected back from the surfaces of objects in the environment. Such reflected pulses may, in turn, be used to perform detection of aspects of the environment, such as vehicles, pedestrians, surfaces, bicycles, etc. If a reflected pulse has been affected by environmental and/or system conditions, the data generated based on the reflected pulse may be an inaccurate representation of the environment and objects therein which, for example in the case of autonomous vehicles and other systems, may lead to unsafe operating conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a pictorial flow diagram of an example process for determining and removing false positive radar detections from radar data collected in an environment, in accordance with examples of the disclosure.

FIG. 3 is a block diagram of a false positive sensor data determination system, in accordance with examples of the disclosure.

DETAILED DESCRIPTION

Figure 1:
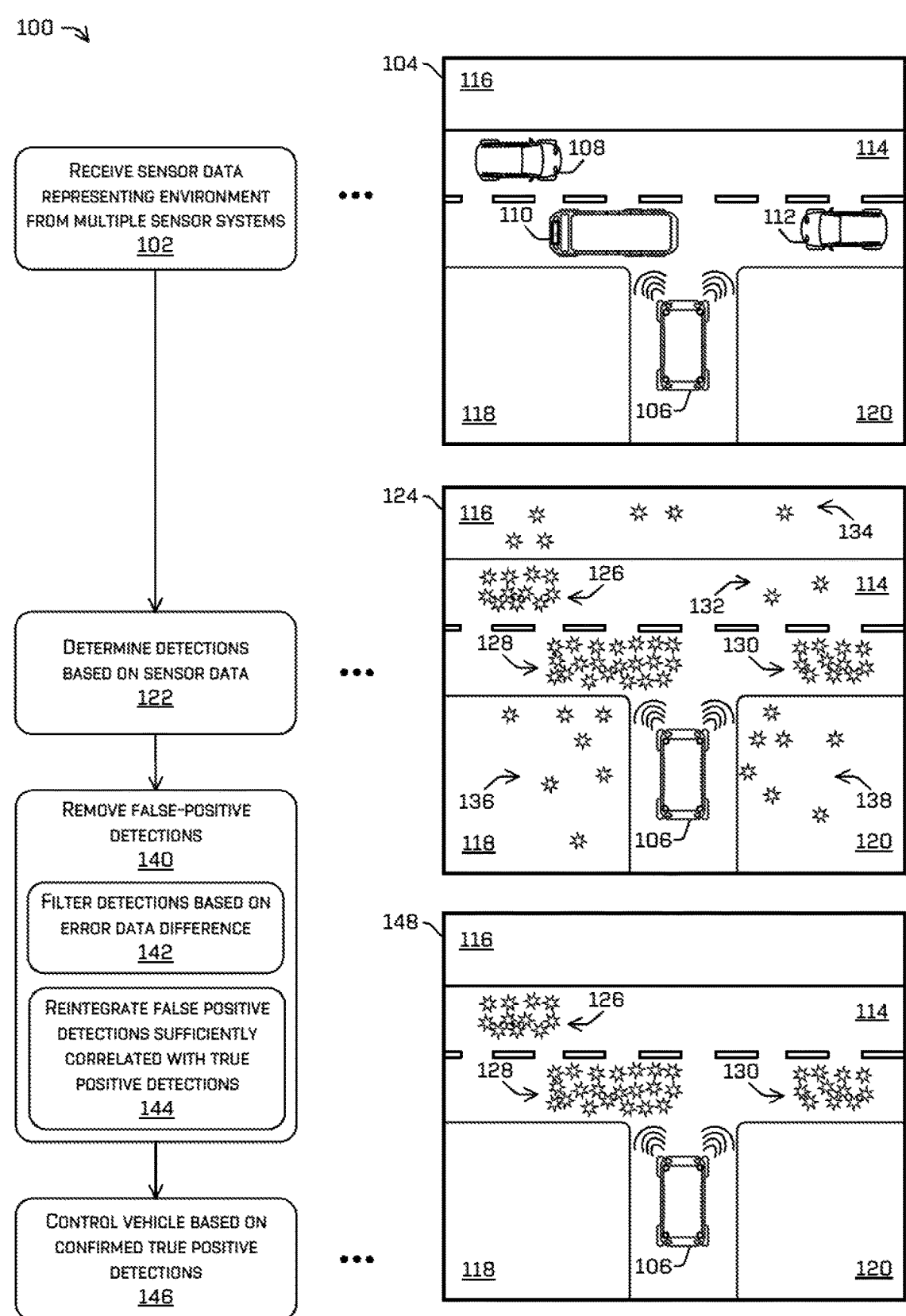
FIG. 1 is a pictorial flow diagram of an example process for determining and removing false positive sensor detections from sensor data collected in an environment, in accordance with examples of the disclosure.

Techniques for improving use of sensor data, such as sensor detection data, discussed herein may include using data received from sensor systems to identify false positive detections to remove such detections from use in operations relating to vehicle control (e.g., of an autonomous vehicle). The disclosed techniques may include integrating a false positive determination system into a vehicle computing system to process sensor data received from one or more sensor systems (e.g., radar, lidar, audio, vision, etc.) to remove false positive sensor detections from the sensor data. This filtered sensor data may then be provided to other systems configured with vehicle computing to perform various operations related to vehicle control. In examples, the filtered sensor data may be provided to a data fusion system that may use a machine-learned model to fuse sensor data associated with multiple sensor modalities to generate data that may then be used by a vehicle perception system to generate one or more representations of an environment in which a vehicle may be traveling. The disclosed techniques and systems may also, or instead, be used in conjunction with other sensor systems and/or any other perception systems and/or other classification systems and/or components to detect and classify objects in a real-world environment in which a vehicle may be traveling.

A vehicle, such as an autonomous vehicle, may be traveling in an environment that may include various objects that may be detected by one or more sensors (e.g., radar, lidar, audio, vision, etc.) configured at a vehicle traveling in the environment. Some objects in the environment, such as vehicles, pedestrians, animals, etc., may be in motion (may be referred to herein as "dynamic" objects). In examples, a dynamic object may be any object associated with a non-zero velocity. In other examples, a dynamic object may be any object with a velocity (whether detected, estimated, etc.) exceeding a minimum velocity (e.g., 0.1 meters per second (m/s), 0.5 m/s, 1.0 m/s, etc.) Other objects in the environment, such as buildings, signs, lights, etc., may not be in motion (may be referred to herein as "static" objects). While the sensor data generated by the sensors configured at the vehicle may generally represent an accurate representation of a detection of a point on a surface of an object (e.g., a return of a sensor emission from such a point), some of the detection data or sensor return data generated by these sensors may be "false positive" data that indicates a detected point that does not actually exist in the environment and/or includes data about the detected point that is inaccurate. For example, false positive detection data (also referred to as "false positive return data") may indicate that an object surface has been detected in the environment at a location where there is no object. False positive detection data may also, or instead, indicate one or more characteristics of an object surface that are inaccurate, such as indicating an inaccurate speed of an object, an incorrect distance of the detected object for the sensor, an incorrect object type (e.g., identifying a static object as dynamic or vice versa), etc.

False positive data may be the result of various environmental and/or other types of conditions. For example, the weather (e.g., rain, snow, fog, etc.) may affect the performance of certain types of sensors by affecting the transmission paths of signals emitted into the environment and/or the receive paths of reflected, signals detected at a sensor, as may other material present in the environment (e.g., dust, debris, leaves, etc.). The nature of objects in the environment may also increase the likelihood of false positive detections. For example, multiple reflective surfaces in the environment result in multipath reflections that may increase false positives. Particular object characteristics may increase the difficulty of detection, such as high object velocity, abrupt movements, low surface cross sections, and the presence of multiple small objects (e.g., birds, pedestrians, etc.) positioned closely together. Noise and interference may also affect sensor equipment and increase the likelihood of false positive detections, as may software and/or algorithmic issues.

When a vehicle (e.g., an autonomous vehicle) traveling in an environment receives false positive detection data from its sensors, it may use such data to perform various operations, such as generating one or more representations of the environment based on a fusion of detection data from various sensor systems (including the false positive detection data) to use for vehicle control within the environment. Because the generated representations of the environment may be inaccurate due to the presence of false positive data, using such representations may result in creating a potentially hazardous condition. Thus, accurate detections of objects in an environment and reduced false positive detections are related to the safe operation of a vehicle and efficient movement of the vehicle through an environment. The disclosed techniques improve the detection of objects and the generation of representations of an environment by reducing or eliminating false positive detections to support autonomous vehicle operations. The disclosed techniques can also improve the accuracy of classification of objects to support autonomous vehicle operations, for example, when the disclosed false positive determination techniques are used in conjunction with data originating at one or more of various modalities (e.g., lidar, radar, vision, sonar, time-of-flight, etc.) to remove false positives and increase the accuracy of the remaining sensor data provided for classification and other operations.

Detection data may include a variety of data provided by a sensor system that may be associated with a particular detection. This data may include general detection data as well as modality-specific data. For example, radar detection data may include radar specific data, such as frequency and power information associated with a radio wave emission and/or a detected reflection, and general detection data associated with the detection surface, such as velocity, range, azimuth, and elevation. Radar detection data may also, or instead, include primary, secondary, tertiary (may also be referred to as "best," "second best," and "third best," respectively), or other versions of measurements or values associated with particular types of data indicated in the radar detection data. For example, radar detection data may include a primary ("best"), secondary ("second best"), and/or tertiary ("third best") velocity, range, azimuth, and/or elevation.

Radar detection data may also, or instead, include angle of arrival error data, such as primary and secondary angle of arrival data. In examples, this radar detection data includes mean squared error (MSE) data that may be associated with any of the values or measurements indicated in the radar detection data. For example, the radar detection data may include a primary array MSE representing an error value associated with an angle of arrival of a received reflected radar emission at an antenna array. The radar detection data may also include a secondary array MSE representing another error value associated with an angle of arrival of a received reflected radar emission at an antenna array. In such examples, the primary array MSE may be associated with the best measurement (e.g., lowest error) of the angle of arrival determined by the radar sensor system (e.g., by an angle of arrival determination algorithm executed at the radar sensor system), while the secondary array MSE may be associated with the second best measurement (e.g., second lowest error, typically (e.g., always) greater than the primary array MSE) of the angle of arrival determined by the radar sensor system.

Radar detection data and data associated with other types of detection (e.g., lidar detection data, sonar detection data, etc.) may also, or instead, include any other type of error data and or any other parameters, any of which may include primary, secondary, tertiary, etc. data. For example, detection data may include a primary detection parameter and a secondary detection parameter for any type of detection data. Detection data may also, or instead, include a primary detection error and a secondary detection error for any type of detection data error. Any of such values may be used to determine a difference (e.g., error difference, parameter difference, etc.) that may be used as described herein (e.g., a first stage of a false positive determination operation as described herein).

The disclosed systems and techniques may use these error values to determine whether a particular radar detection is likely to be a false positive detection. For example, a greater difference between the primary array MSE and the secondary array MSE may indicate a greater likelihood that the detection is accurate (e.g., the detection is more likely to be a true positive detection of an actual surface of an object (e.g., a true positive sensor return)). This is because when there is a large difference between the primary array MSE and the secondary array MSE, the primary array MSE is necessarily small compared to the secondary array MSE, and therefore the likelihood of the angle of arrival being accurate is greater (because the primary error associated with the determined angle of arrival is low). On the other hand, if there is a smaller difference between the primary array MSE and the secondary array MSE, both values may be more likely to be associated with higher error, and therefore the determined angle of arrival may not be accurate.

In examples, the system may perform two-stage false positive determination operations using the error data to determine whether individual detections are likely to be false positives. In some examples, the system may initially remove any static detections (e.g., velocity equal to zero or below a threshold velocity) from inclusion in the subsequent false positive determination operations, while in other examples, static and dynamic detections alike (e.g., all detections) may be processed in the subsequent false positive determination operations. The system may then compare the primary array MSE and the secondary array MSE of an individual radar detection to determine whether the difference between these two values meets or exceeds an MSE threshold. This MSE threshold value may be determined statically or dynamically and may be based on one or more criteria. If the array MSE difference meets or exceeds the threshold, the associated radar detection may be determined to be a true positive. The corresponding radar detection data may be stored as true positive radar detection data and used for further operations by the vehicle computing system. Alternatively, if the array MSE difference between the primary array MSE and the secondary array MSE falls below the threshold, the associated radar detection may be determined to be a false positive, subject to further evaluation. The determined difference between the primary array MSE and the secondary array MSE may be stored with the radar detection data for use in subsequent operations as described herein.

In examples, a confidence value may be used rather than, or in addition to, a difference for performing the first stage false positive determination operations. For example, a confidence associated with an angle of arrival value may be used (e.g., compared to a threshold) to make an initial determination of whether a detection is a true positive or a false positive. Other values, especially those related to the confidence in or accuracy of a value that may be associated with a detection may be used for this initial true or false positive determination.

At the next stage of the false positive determination operation, an initially designated false positive radar detection may be further evaluated by comparing the associated radar detection data to radar detection data associated with one or more true positive radar detections to determine whether the initially designated false positive radar detection correlates to a sufficient quantity of true positive radar detections. In this operation, a counter may be initialized for the initially designated false positive radar detection (e.g., to zero). A position (e.g., x, y, z coordinates represented in the radar detection data) of the initially designated false positive radar detection may be compared to a position of an individual true positive radar detection, the velocity of the initially designated false positive radar detection may be compared to the velocity of the true positive radar detection, and/or the determined array MSE difference (e.g., difference between the primary array MSE and the secondary array MSE) of the initially designated false positive radar detection may be compared to the determined array MSE difference of the true positive radar detection. If an individual or any subset of these values have a correlation equal to or greater than a correlation threshold, then the initially designated false positive radar detection may be determined to be correlated with the true positive radar detection, and a counter associated with the initially designated false positive radar detection may be incremented. Otherwise, the initially designated false positive radar detection counter may remain unchanged.

For example, if the position, the velocity, and the array MSE difference of an initially designated false positive radar detection sufficiently correlate to those values for a true positive radar detection, the counter associated with the initially designated false positive radar detection may be incremented by one. Otherwise, the counter may remain unchanged. In examples, "sufficiently correlated" may be associated with a threshold correlation (e.g., 75%, 85%, 90%, 95%, etc.). The system may aggregate the correlations by requiring that each of the designated values correlate sufficiently in order to determine that the initially designated false positive radar detection is correlated with the true positive radar detection (and therefore increment the counter). For instance, the system may require that each of the position, the velocity, and the array MSE difference of the initially designated false positive radar detection sufficiently correlate to those values for the true positive radar detection. Alternatively, the system may require that only a subset of the threshold number of the designated values correlate sufficiently (e.g., one or two of three). In examples, the system may use different thresholds for different values. For example, a correlation threshold of 85% may be used for position, while a correlation threshold of 95% may be used for velocity, and so forth.

The system may perform such correlation determinations for an individual designated false positive radar detection against a set of multiple true positive radar detections. For example, the system may generate a set of true positive radar detections based on the first stage of the false positive determination operation described above (e.g., based on array MSE differences). The system may then perform correlation determinations for the individual radar detections designated as false positives in the first stage of the false positive determination operation using individual true positive radar detections in the set of designated true positive radar detections. The system may perform such correlation determinations until the initially designated false positive radar detection counter meets or exceeds a counter threshold or until there are no remaining true positive radar detections in the set of true positive radar detections. In this way, the system may determine whether the initially designated false positive radar detection is correlated with a sufficient number of true positive radar detections to be considered a likely true positive radar detection.

In examples, correlations may be determined using data matrices representing detection data values. For instance, an individual data matrix may be generated for a false positive detection that includes detection data values associated with that detection, such as a 5×N matrix containing, coordinates x, y, and z, a velocity value, and a determined array MSE difference (e.g. determined at the stage one operations). This matrix may be compared to a similar matrix for a true positive detection for a correlation determination. If the resulting correlation value surpasses a correlation threshold (e.g. 85%, 90%, 95%, etc.), the counter associated with the false positive radar detection may be incremented.

In examples, the system may use one or more clustering algorithms and/or operations instead of, or in addition to, correlation determinations for the second stage of the two-stage false positive determination operations. For instance, the system may determine whether an individual false positive sensor detection clusters (e.g., sufficiently) with one or more other true positive detections (e.g., with a sufficient number of true positive detections). If so, the system may determine that that false positive detection is a true positive detection. If not, the false positive detection may remain designated as a false positive detection.

Thus, an initially designated false positive radar detection may be determined to be a true positive radar detection because it is sufficiently related to (e.g., correlated with) other true positive radar detections. The sufficiency of relation or correlation may be based on the counter threshold, which may be set and/or adjusted to an appropriate value (e.g., 10, 20, 25, 50, etc.) based on various criteria. For example, the counter threshold may be set to a particular value by a user. Alternatively, the counter threshold may be set dynamically based on a total number of detections. For example, the counter value may be a percentage of the total number of detections such as 10% of a total number of detections (e.g., a counter value of 10 for a total of 100 detections). In other examples, a counter threshold value may be based on a distance from a sensor associated with a detection. For example, detection data may indicate a measured distance from a sensor (e.g., "range" in radar data). For detections associated with a longer distance value, the counter threshold may be lower than that for detections associated with a shorter distance value. In some examples, there may be individual counter thresholds for short, medium, and long distance detections (e.g., relatively smaller, medial, and larger counter threshold values (e.g., 5, 10, 25), respectively). Any other criteria may be used to determine, statically and/or dynamically, a counter threshold.

If the threshold counter for an individual initially designated false positive radar detection meets or exceeds the counter threshold, that radar detection is redesignated a true positive radar detection and is then may be used for vehicle control operations and/or other operations. For example, the now-designated true positive radar detection may be used in a fusion operation with detections associated with other modalities to generate one or more representations of the environment (e.g., one or more top-down representations, one or more three-dimensional representations, etc.) that may then be used in planning, perception, and/or vehicle control operations. Those initially designated false positive radar detections that fail to correlate with a sufficient number of true positive radar detections (e.g., after being compared to (e.g., all) the available true positive radar detections using the disclosed correlation determination operation(s)) may not be used for further operations and/or may be removed from radar detection data provided to one or more other systems and/or components by the false positive determination system. Alternatively or additionally, false positive detections may be flagged or otherwise associated with data indicating that they are false positive detections. True positive detection may be similarly flagged or indicated. Such flagged or indicated detections (e.g., both true and false positive detections) may be provided for further operations.

In examples, once an individual initially designated false positive radar detection is redesignated as a true positive radar detection, it may be added to the set of true positive radar detections for use in subsequent correlation determination operation(s) to evaluate remaining initially designated false positive radar detections, if any.

The initial set of radar detections and associated data may be represented in various data structures and may be associated with radar detections that originated at one or more radar sensor systems. For example, the false positive determination operations disclosed herein may be performed on a radar point cloud that includes radar detection data generated by one or more radar sensor systems. Such a point cloud may represent data generated by a single radar sensor system or aggregated data generated by multiple radar sensor systems (e.g., all or a subset of all the radar sensor systems configured at a vehicle). Alternatively or additionally, the initial set of radar detections and associated data processed by a false positive determination system may be represented as frames of radar data, similarly associated with one or more radar sensor systems.

In other examples, the two-stage false positive determination operations described herein may be performed using other data types and/or for data associated with other sensor modalities. For example, lidar data (e.g., lidar point clouds, lidar data frames, etc.) may be processed using the disclosed false positive techniques to determine false positive lidar detections. Sonar or other audio-based data, vision data, and/or any other type of sensor data may also be processed using the disclosed techniques.

Other types of data may also be processed in a similar manner using the disclosed operations. For example, the first stage and/or the second stage of the false positive determination operations described above may use any data value that is associated with other types of error instead of, or in addition to, array MSEs (e.g., range MSEs, azimuth MSEs, velocity MSEs, elevation MSEs, other types of error values for radar and/or other sensor modalities). Alternatively or additionally, the first stage and/or the second stage of the false positive determination operations described above may use any other type of data value that may be associated with a detection of any kind (e.g., range, azimuth, velocity, elevation, location, position, other types of data values for radar and/or other sensor modalities).

In examples, any or all detections associated with a particular modality may be processed using one or more of the false positive determination operations described herein. In other examples, an initial filtering process may be used to limit false positive determination operations to dynamic detections, for example, to increase operation efficiency. For example, detections having a non-zero velocity or having a velocity meeting or exceeding a minimum velocity threshold may be processed using one or more of the false positive determination operations described herein, while other detections may be excluded from such operations.

The systems and techniques described herein may be directed to leveraging sensor data and associated data to improve sensor detections used by a vehicle, such as an autonomous vehicle, operating in an environment. More specifically, the disclosed systems and techniques may be directed to facilitating more accurate detection of objects and surfaces in an environment by reducing or eliminating false positive detections in data used to ultimately control the vehicle. Using this improved detection data, a vehicle may generate safer and more efficient trajectories for use in navigating through an environment. In particular examples, the systems and techniques described herein can utilize various types of radar, lidar, and/or other types of sensor data to more accurately and efficiently determine representations of an environment and objects located therein that may then be used to perform vehicle control operations. The examples described herein may result in increased certainty and accuracy in sensor detections, thereby allowing an autonomous vehicle to generate more accurate and/or safer trajectories for the autonomous vehicle to traverse in the environment.

For example, techniques described herein may increase the reliability of the determination of the presence of objects in the environment by reducing or eliminating false positive detections, thereby reducing the likelihood of controlling the vehicle in response to a non-existent object and potentially introducing a hazardous condition. That is, the techniques described herein provide a technological improvement over existing detection technology and vehicle tracking and/or navigation technology. In addition to improving the accuracy of detections and, therefore, object classifications within an environment, the systems and techniques described herein can provide a smoother ride and improve safety outcomes by, for example, more accurately providing safe passage to an intended destination through an environment in which other objects may be present. Moreover, the systems and techniques disclosed herein may prevent unnecessary braking or hard-braking to avoid nonexistent objects that may not actually be present in the environment, but have been classified and represented as being within the environment based on false positive sensor detection data.

The techniques described herein may also improve the operation of computing systems and increase resource utilization efficiency. For example, computing systems, such as vehicle computing systems, may more efficiently perform sensor detections and related operations using the data generated by the false positive determination operations according to the techniques described herein because, instead of using detections that may include false positive detections, the disclosed examples may reduce the number of detections used to make object determinations and generate environmental representations by removing false positive detection data from such data. The disclosed examples may also reduce the data processing required to determine false positive detections at downstream components and processes because the disclosed false positive determination operations may remove most or all of such false positive detections before providing the detection data to such downstream components and processes, thereby reducing the operations needed at the downstream components and processes to correct and/or adjust sensor detections. This reduction in extraneous processing therefore increases the overall efficiency of such systems over what would be possible using conventional techniques. Moreover, the techniques discussed herein may reduce the amount of data used by computing systems to determine and process object classifications, generate environment representations, and/or perform other operations due to the improved accuracy of sensor detection data provided by a false positive determination system, which may reduce latency, memory usage, power, time, and/or computing cycles required to detect and categorize objects in an environment.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, any one or more of various types of sensors and emitters are contemplated, as well as various types of sensor data (e.g., audio, lidar, time-of-flight, sonar, radar, vision). Furthermore, the disclosed systems and techniques may include using various types of components and various types of data and data structures, including, but not limited to, various types of radar data and/or other sensor data associated with various types of sensor systems (e.g., microphones, audio sensors, stereo cameras, time-of-flight sensors, radar sensors, sonar sensors, vision sensors, lidar sensors, and the like). For example, the techniques may be applied to any such sensor systems. Additionally, the techniques described herein can be used with real data (e.g., captured using sensor(s)), simulated data (e.g., generated by a simulator), or any combination of the two.

FIG. 1 is a pictorial flow diagram of an example process 100 for filtering false positive sensor detection data from sensor data collected in an environment that may be used to perform vehicle control operations for a vehicle that may be operating in the environment. In some examples, one or more operations of the process 100 may be implemented by a vehicle computing system, one or more components of the vehicle computing system. Any such system or component may be referred to herein as a "vehicle computing system." Such vehicle computing systems may include and/or implement one or more of the components and systems illustrated in FIGS. 3, 4, and 5, and described below.

For example, one or more components and systems can include those associated with one or more of the vehicle computing system 302, the vehicle computing system 408, and the vehicle computing device 504, including any one or more of the radar false positive determination component 306, the lidar false positive determination component 312, the false positive determination system 406, the false positive determination component(s) 524, and/or any components configured therein. In some examples, the one or more operations of the process 100 may also, or instead, be performed by a remote system that may be in communication with a vehicle, such as the false positive determination component(s) 548 of the computing device(s) 538 illustrated in FIG. 5. In still other examples, the one or more operations of the process 100 may be performed by a combination of a remote system and a vehicle computing system. However, the process 100 is not limited to being performed by such components and systems, and the components and systems of FIGS. 3, 4, and 5 are not limited to performing the process 100.

At operation 102, sensor data representing an environment in which a vehicle may be traveling may be received at a vehicle computing system or other computing system. For example, the system performing the operations of process 100 may be a system configured to receive sensor detection data from one or more sensor systems, including, but not limited to, radar detection data from a radar sensor system, lidar detection data from a lidar sensor system, sonar detection data from a sonar sensor system, etc. The system performing the operations of process 100 may be further configured to perform one or more of the disclosed false positive determination operations to generate detection data that may then be used to perform various other operations, such as vehicle control operations. In various examples, sensor data of any type may be collected in the environment or otherwise generated based on sensor system operations and stored as point cloud data, frames of sensor detection data, and/or other data structures representing sensor detection data. While the examples used for process 100 may be radar detection data examples based on data generated by a radar sensor system, the process 100 may be applicable to any one or more types of detection data and sensor systems.

The sensor detection data received at 102 may represent detections generated by one or more sensor systems. This detection data may include any of the detection data described herein, including velocity, range, azimuth, elevation, and any type of error data, such as array MSE. Moreover, this sensor detection data may include primary, secondary, tertiary, etc. variations of such data. For example, the sensor detection data may include radar detection data that may include primary and secondary array MSE data, position data, and/or velocity data. In examples, this sensor detection data may be generated by one or more sensor systems and may be processed and/or modified by such sensor systems. In such examples, the raw sensor data collected by such sensor systems may not be accessible by the vehicle computing system. Therefore, the false positive determination operations described herein may be performed using the detection data generated by such sensor systems to determine false positives in lieu of using raw sensor data.

An example 104 illustrates a top-down view of a portion of an environment in which a vehicle 106 may be traveling. The vehicle 106 may be configured with one or more sensor systems that may generate sensor detection data, such as one or more radar sensor systems and/or one or more lidar sensor systems. Various objects and regions may be included in the portion of the environment represented in example 104. For example, the vehicle 106 may be traveling on a roadway 114. There may be other vehicles traveling on the roadway 114, such as vehicles 108, 110, and 112. There may also be non-drivable regions in this portion of the environment, such as regions 116, 118, and 120.

At operation 122, the vehicle computing system may determine one or more detections indicated in the sensor data received at operation 102. In some examples, any type of detection (e.g., all detections) may be determined and processed further, while in other examples, (e.g., only) dynamic detections (e.g., detections having a non-zero velocity or having a velocity meeting or exceeding a minimum velocity threshold) may be further processed. For example, the system may identify within the sensor data, detection data indicating the detection of a surface or object in motion by one or more of the sensor systems that generated the received sensor data. The vehicle computing system may perform this operation for one or more particular types of sensor detection data (e.g., radar and/or lidar detection data) and/or generally for any (e.g., all) types of sensor detection data.

An example 124 illustrates a top-down view of the portion of the environment introduced in example 104. Individual sensor detections are indicated as stars in this example. As can be seen here, there are clusters of detections at the locations of objects shown in example 104 as well as various detections in other areas. For example, cluster 126 is a cluster of detections at the location of the vehicle 108, cluster 128 is a cluster of detections at the location of the vehicle 110, and cluster 130 is a cluster of detections at the location of the vehicle 112. There are also detections 132 in the roadway 114, but not at a location where a vehicle was present, thereby representing potential false positive detections. Similarly, there are detections 134 in the region 116, detections 136 in the region 118, and detections 138 in the region 120. Since there are no objects in these regions, these detections may also represent potential false positive detections.

At operation 140, the vehicle computing system may remove false positive detections from the detections determined at operation 122. In examples, this may be accomplished by performing the two-stage false positive determination operations as described herein, where operation 142 represents the first stage and operation 144 represents the second stage.

At operation 142, the system may filter or otherwise designate detections as false positive or true positive based on error differences within the detections data of the individual detections. For example, the system may determine the difference between a primary array error (e.g., primary array MSE) and a secondary array error (e.g., secondary array MSE) for an individual detection. The system may then determine whether the difference meets or exceeds an error threshold value. If the difference meets or exceeds the error threshold value, the system may designate that individual detection as a true positive and/or otherwise associate that individual detection with a set of true positive detections. Otherwise, if the difference does not meet the error threshold value, the system may designate that individual detection as a false positive and/or otherwise associate that individual detection with a set of false positive detections.

The system may next process the set of false positive detections at operation 144 to determine if any of such detections should be redesignated as true positive detections. For example, the system may compare individual detections in the set of false positive detections to the detections in the set of true positive detections to determine if the individual false positive detections sufficiently correlate to a threshold number of true positive detections (as described in more detail herein). If an individual false positive detection sufficiently correlates to the threshold number of true positive detections, the system may redesignate that detection as a true positive detection and/or otherwise associate that individual detection with the set of true positive detections. The redesignated true positive detection can then be used for comparisons to remaining false positive detections. Otherwise, an individual false positive detection that does not sufficiently correlate to the threshold number of true positive detections may be removed for use in further operations and/or remain associated with the set of false positive detections.

Note that the operations 142 and 144 may performed in any order and using alternative or additional means. For example, operation 144 may be performed before, or in parallel, with operation 142. Operation 144 may use one or more clustering algorithms and/or operations in addition to, or instead of, the correlation operations as described herein.

At operation 146, the vehicle computing system may perform one or more operations, including vehicle control operations, using the set of true positive detections. For example, the vehicle computing system may generate one or more representations of the environment (e.g., top-down representation, three-dimensional representation, etc.) using the true positive detection data that may then be used to control the vehicle through the environment. Additionally or alternatively, the system may classify and/or identify objects in the environment based on the true positive detection data.

In some examples, such classifications and other object data may be combined with the environmental representations and used for vehicle control operations.

An example 148 illustrates a top-down view of the portion of the environment introduced in example 104 and illustrating a subset of the detections illustrated in example 124. As can be seen here, the system may have determined that the cluster 126 at the location of the vehicle 108, the cluster 128 at the location of the vehicle 110, and the cluster 130 at the location of the vehicle 112 are clusters of true positive detections. On the other hand, the system may have determined that the detections 134 in the region 116, the detections 136 in the region 118, and the detections 138 in the region 120 may have been false positive detections. Therefore, the system may have removed these detections from use in controlling the vehicle 106. Thus, the vehicle computing system may use the detections of 126, 128, and 130 illustrated in this example to perform operations to control the vehicle 106 safely through the environment.

In various examples, one or more operations of the process 100 may be omitted and/or other operations may be included in the process 100 that may not be explicitly described herein. All such implementations are contemplated as within the scope of the instant disclosure.

FIG. 2 is a pictorial flow diagram of an example process 200 for filtering false positive radar detection data from radar sensor data collected in an environment that may be used to perform vehicle control operations for a vehicle that may be operating in the environment. In some examples, one or more operations of the process 200 may be implemented by a vehicle computing system, one or more components of the vehicle computing system. Any such system or component may be referred to herein as a "vehicle computing system." Such vehicle computing systems may include and/or implement one or more of the components and systems illustrated in FIGS. 3, 4, and 5, and described below.

For example, one or more components and systems can include those associated with one or more of the vehicle computing system 302, the vehicle computing system 408, and the vehicle computing device 504, including any one or more of the radar false positive determination component 306, the lidar false positive determination component 312, the false positive determination system 406, the false positive determination component(s) 524, and/or any components configured therein. In some examples, the one or more operations of the process 200 may also, or instead, be performed by a remote system that may be in communication with a vehicle, such as the false positive determination component(s) 548 of the computing device(s) 538 illustrated in FIG. 5. In still other examples, the one or more operations of the process 200 may be performed by a combination of a remote system and a vehicle computing system. However, the process 200 is not limited to being performed by such components and systems, and the components and systems of FIGS. 3, 4, and 5 are not limited to performing the process 200.

At operation 202, radar data generated by a radar sensor system and representing a point cloud of radar detections may be received that represents detections within an environment, for example, by the radar sensor system configured at a vehicle. The radar data may be received in a data structure representing the radar point cloud and/or radar data frames. In examples, this radar data may be filtered to include (e.g., only) dynamic detections by removing static detections, which may be defined as those detections with a velocity value below a threshold and/or at zero.

An example 204 illustrates a top-down view of a portion of an environment that may include an object 206 (dashed outline) and detections 208 that may be represented in radar data received from a radar sensor system. The detections 208 may be the initially received dynamic radar detections (and associated detection data) from the radar sensor system (e.g., before processing using the disclosed false positive determination operations).

At operation 210, the system may determine, for individual radar detections in the radar data received at operation 202, a difference between a primary array MSE and a secondary array MSE represented in the detection data for the respective individual radar detection. As noted herein, while in this example an array MSE difference is used, other values represented in radar detection data, and other values for other types of detection (e.g., associated with other modalities), may also, or instead, be used to perform this operation.

At operation 212, the system may determine if the difference between the primary and secondary array MSEs for the individual radar detections meets or exceeds an array MSE threshold value. As described herein, this value may be statically or dynamically determined and may be based on one or more of various criteria.

If the system determines, at operation 212, that an individual radar detection has an array MSE difference that meets or exceeds the MSE threshold value, the system may add that detection to a set of true positive radar detections at operation 220. If the system determines, at operation 212, that an individual radar detection has an array MSE difference that falls below the MSE threshold value, the system may proceed to operation 216 to perform further evaluation of the detection, tentatively designating the detection as a false positive.

An example 214 illustrates a top-down view of the portion of the environment introduced with the example 204 that may include the detections 208 that may now be designated as true positive or false positive detections based on the operations 210 and 212. In this example, the white stars represent detections confirmed to be true positive detections based on their associated array MSE differences as determined at operation 210 and evaluated at operation 212. The black stars represent detections determined to potentially be false positive detections based on their associated array MSE differences as determined at operation 210 and evaluated at operation 212. As can be seen in this figure, based only on MSE differences, several detections that are clearly associated with the object 206 have been determined (likely incorrectly) to be false positives.

At operation 216, the false positive detections determined based on array MSE difference may be further evaluated using the true positive detections also determined based on array MSE difference. For example, the system may compare an individual radar detection initially designated as false positive at operation 212 to radar detection data associated with one or more true positive radar detections in the set of true positive radar detections generated at operation 220. In examples, the system may perform the correlation determinations described herein to determine whether the individual false positive radar detection correlates to a sufficient quantity of the true positive radar detections. For instance, the system may initialize (e.g., at zero) and maintain a counter for the individual false positive radar detection. The system may then increment the counter (e.g., by one) each time the individual false positive radar detection sufficiently correlates to an individual true positive radar detection. If the counter is incremented up to or beyond a counter threshold value, the system may then redesignate that individual false positive radar detection as a true positive radar detection and/or add it to the set of true positive radar detections. On the other hand, if the counter fails to meet the counter threshold value after comparing the individual false positive radar detection to (e.g., all) the individual true positive radar detections of the set of true positive radar detections, the system may leave the individual false positive radar detection designated as a false positive and/or otherwise remove it from use in further operations.

The correlation determination performed at operation 216 may be based on any one or more values included in radar detection data. For example, position data (e.g., x, y, z coordinates represented in the radar detection data) associated with the false positive radar detection may be compared to position data of an individual true positive radar detection to determine if it sufficiently correlates (e.g., indicates that the two detections are proximate in space within the environment). This correlation may be based on determining whether the two positions are within a threshold distance of one another or at or above a threshold correlation value (e.g., 85%, 90%, 95%, etc.).

In examples, velocity data (e.g., m/s and/or a direction) associated with the false positive radar detection may also, or instead, be compared to velocity data of an individual true positive radar detection to determine if it sufficiently correlates (e.g., indicates that the two detections are traveling at approximately the same speed and/or in approximately the same direction within the environment). This correlation may be based on determining whether the two positions are within a threshold difference of velocity and/or direction of one another or at or above a threshold correlation value (e.g., 85%, 90%, 95%, etc.).

In examples, the array MSE difference (e.g., difference between primary array MSE and secondary array MSE) associated with the false positive radar detection may be compared to the array MSE difference of an individual true positive radar detection to determine if it sufficiently correlates (e.g., indicates that the two detections have similar array MSE differences). This correlation may be based on determining whether the two array MSE differences are within a threshold difference of one another or at or above a threshold correlation value (e.g., 85%, 90%, 95%, etc.).

In examples, if all of these individual values for the false positive radar detection and the individual true positive radar detection are sufficiently correlated, the system may determine that the false positive radar detection is a true positive radar detection. In other examples, if a sufficient (e.g., at least a threshold) number of individual values for the false positive radar detection and the individual true positive radar detection are sufficiently correlated, the system may determine that the false positive radar detection is a true positive radar detection. In response, the system may increment the counter associated with the false positive radar detection. Otherwise, the system may leave the counter unchanged. In other examples, other values may be compared for correlation determinations and/or a subset, rather than all, of the associated determined correlations may be required to increment the correlation counter.

In examples, instead of, or in addition to determining correlations as described above, the system may use one or more clustering algorithms and/or operations to determine whether an individual false positive radar detection clusters (e.g., sufficiently) with one or more true positive radar detections (e.g., with a sufficient number of true positive radar detections). If so, the system may determine that that false positive radar detection is a true positive radar detection and increment the correlation counter.

At operation 218, the system may determine if the false positive detections are sufficiently correlated with the counter threshold value. If not, at operation 224, the system may add the false positive detections that are not sufficiently correlated with the counter threshold value to the set of false positive detections and/or filter out such detections from vehicle control data that may be used in further operations, such as vehicle control operations. If the system determines that a false positive detection is sufficiently correlated with the counter threshold value, at operation 220 the system may add that false positive detection to the set of true positive detections and/or redesignate that detection as a true positive detection. The system may then use the true positive detection for other operations, including vehicle control operations at operation 226.

An example 222 illustrates a top-down view of the portion of the environment introduced with the example 204 that may include the detections 208 that were designated as true positive or false positive detections based on the operations 210 and 212 in example 214. In this example, the black stars initially determined to be false positives may have been further evaluated as described above at operations 216 and 218 to determine if they are actually false positives. As can be seen in this figure, based on these further evaluations, several detections that were previously designated as false positives and that were clearly associated with the object 206 have been determined to actually be true positives and have therefore been redesignated as such.

In various examples, one or more operations of the process 200 may be omitted and/or other operations may be included in the process 200 that may not be explicitly described herein. All such implementations are contemplated as within the scope of the instant disclosure.

FIG. 3 is a block diagram of an example false positive determination and detection data generation system 300 according to various examples. The system 300 may be configured at a vehicle computing system 302. The vehicle computing system 302 and/or one or more of its components may be configured at a vehicle (e.g., an autonomous vehicle). The system 300 may include one or more of the components and systems illustrated in FIG. 5 described below. For example, one or more components and systems can include those associated with one or more of the sensor systems(s) 506, the perception component 522, the planning component 528, and/or the false positive determination component(s) 524. In some examples, the one or more components of the system 300 may also, or instead, be implemented at a remote system in communication with a vehicle, such as the perception component 544, the planning component 550, and/or the false positive determination component(s) 548 illustrated in FIG. 5. In still other examples, one or more operations of the system 300 may be implemented as a combination of components at a remote system and a vehicle computing system. However, the system 300 is not limited to being performed by such components and systems, and the components and systems of FIG. 5 are not limited to implementing the system 300.

The vehicle computing system 302 may be configured with one or more sensor systems 304. The sensor system(s) 304 may include one or more radar sensor systems, one or more lidar sensor systems, and/or one or more other sensor systems of any modality that may be configured at a vehicle. Sensor data originating at the sensor system(s) 304 may include detection data associated with particular sensor systems. This data may be provided by the sensor system(s)

304 to one or more false positive determination components configured to perform false positive determination operations for particular types of sensor detection data. For example, a radar sensor system of the sensor system(s) 304 may provide radar detection data to a radar false positive determination component 306. Similarly, a lidar sensor system of the sensor system(s) 304 may provide lidar detection data to a lidar false positive determination component 312.

The radar false positive determination component 306 may include a radar error difference determination component 308 and a radar correlation determination component 310. The radar error difference determination component 308 may be configured to determine differences between primary and secondary array MSEs for individual radar detections as described herein. Alternatively or additionally, the radar error difference determination component 308 may be configured to determine one or more differences between other comparable values or measurements represented in radar detection data, including other types of error values, confidence values, measurements, etc. The radar error difference determination component 308 may further be configured to compare determined differences (e.g., array MSE differences) to a threshold value to determine whether to designate a particular radar detection as a false positive or a true positive detection.

The radar correlation determination component 310 may be configured to further process those radar detections determined by the radar error difference determination component 308 to be false positives. In examples, the radar correlation determination component 310 may compare individual false positive radar detections against individual true positive radar detections to determine whether the individual detections correlate to one another. For each correlation, the radar correlation determination component 310 may increment a counter associated with the false positive radar detection, adding the false positive radar detection to the set of true positive radar detections if the counter reaches a counter threshold. If the radar correlation determination component 310 fails to determine a sufficient number (e.g., threshold value) of correlations with true positive detections for a particular false positive radar detection, the false positive radar detection may remain associated with the set of false positive radar detections and/or otherwise removed from use as vehicle control data.

The radar false positive determination component 306 may provide the set of true positive radar detections, as determined by the radar error difference determination component 308 and the radar correlation determination component 310, to one or more other vehicle computing system 302 components for other operations. For example, the true positive radar detections may be provided to a perception component 318 for other perception and/or detection operations. In particular examples, the true positive radar detections may be provided to a fusion component 320 of the perception component 318 for fusion with data associated with other modalities that the perception component 318 may then use to perform vehicle control operations (e.g., generate representations of the environment, classify objects in the environment, etc.). The true positive radar detections may also, or instead, be provided to a planning component 322 for planning vehicle trajectories and paths (e.g., based on the true positive radar detections) and/or a prediction component 324 for predicting the actions of other objects (determined and/or classified based on the true positive radar detections) within the environment. The true positive radar detections may also, or instead, be provided to one or more vehicle control components 326 for determining and implementing vehicle controls (such as maneuvering a vehicle around objects represented in the true positive radar detections). Any of these components may interoperate with a mapping component 328 that may provide map data for performing vehicle control operations.

The lidar false positive determination component 312 may include a lidar error difference determination component 314 and a lidar correlation determination component 316. The lidar error difference determination component 314 may be configured to determine differences between primary and secondary error values for individual lidar detections as described herein. Alternatively or additionally, the lidar error difference determination component 314 may be configured to determine one or more differences between other comparable values or measurements represented in lidar detection data, including other types of error values, confidence values, measurements, etc. For instance, the lidar error difference determination component 314 may determine a signal power parameter (e.g., transmit power) and/or a reflectivity parameter. The lidar error difference determination component 314 may further be configured to compare determined differences (e.g., error differences, other parameter differences) and/or a parameter (e.g., a signal power parameter, a reflectivity parameter, etc.) to a threshold value to determine whether to designate a particular lidar detection as a false positive or a true positive detection.

In other examples, an average parameter value may be determined for a plurality of detections and compared to individual parameter values. Those detections having parameter values that sufficiently differ (e.g., meeting or exceeding a difference threshold) from the average value for the parameter may be determined to be false positives by the lidar error difference determination component 314. For instance, the average value for power or reflectivity for a set of lidar detections may be determined for a particular area or space in the environment. Individual values for such a parameter may be compared to this average value to determine if the detections associated with those individual values are to be determined to be false positives. Similar operations may be performed for other modalities and/or other parameters (e.g. radar parameters, such as power, signal-to-noise ratio, etc.).

The lidar correlation determination component 316 may be configured to further process those lidar detections determined by the lidar error difference determination component 314 to be false positives. In examples, the lidar correlation determination component 316 may compare individual false positive lidar detections against individual true positive lidar detections to determine whether the individual detections correlate to one another. This correlation operation may be performed using any of the lidar parameter differences (error or otherwise) and/or lidar parameters described herein. For instance, the lidar correlation determination component 316 may determine whether signal power and/or reflectivity of a false positive lidar detection sufficiently correlate to the corresponding values for a true positive lidar detection. For each correlation, the lidar correlation determination component 316 may increment a counter associated with the false positive lidar detection, adding the false positive lidar detection to the set of true positive lidar detections if the counter reaches a counter threshold. If the lidar correlation determination component 316 fails to determine a sufficient number (e.g., threshold value) of correlations with true positive detections for a particular false positive lidar detection, the false positive lidar detection may remain associated with the set of false positive lidar detections and/or otherwise removed from use as vehicle control data.

The lidar false positive determination component 312 may provide the set of true positive lidar detections, as determined by the lidar error difference determination component 314 and the lidar correlation determination component 316, to one or more other vehicle computing system 302 components for other operations. For example, the true positive lidar detections may be provided to the perception component 318 for other perception and/or detection operations. In particular examples, the true positive lidar detections may be provided to the fusion component 320 of the perception component 318 for fusion with data associated with other modalities that the perception component 318 may then use to perform vehicle control operations (e.g., generate representations of the environment, classify objects in the environment, etc.). The true positive lidar detections may also, or instead, be provided to the planning component 322 for planning vehicle trajectories and paths (e.g., based on the true positive lidar detections) and/or the prediction component 324 for predicting the actions of other objects (determined and/or classified based on the true positive lidar detections) within the environment. The true positive lidar detections may also, or instead, be provided to the vehicle control component(s) 326 for determining and implementing vehicle controls (such as maneuvering a vehicle around objects represented in the true positive lidar detections). Any of these components may interoperate with a mapping component 328 that may provide map data for performing vehicle control operations.

Figure 4A:
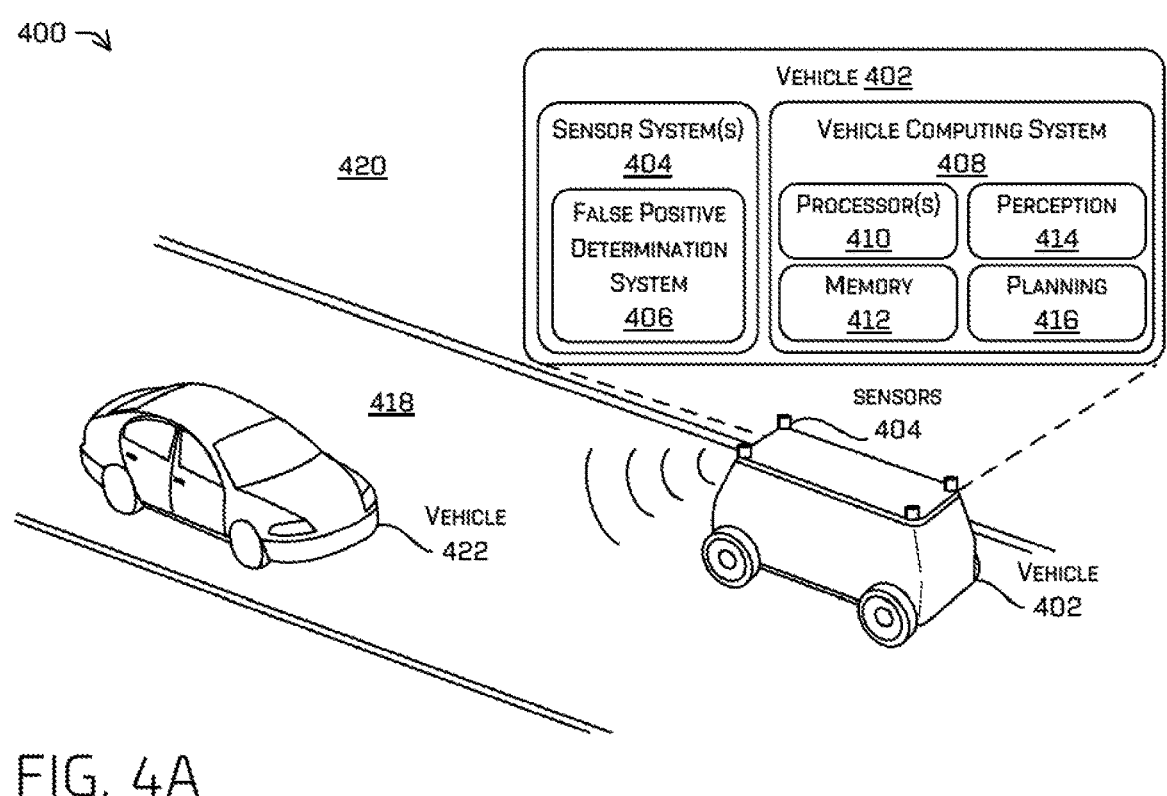
FIG. 4A is a diagram of an example environment in which a vehicle may detect objects using one or more sensor systems, in accordance with examples of the disclosure.
Figure 5:
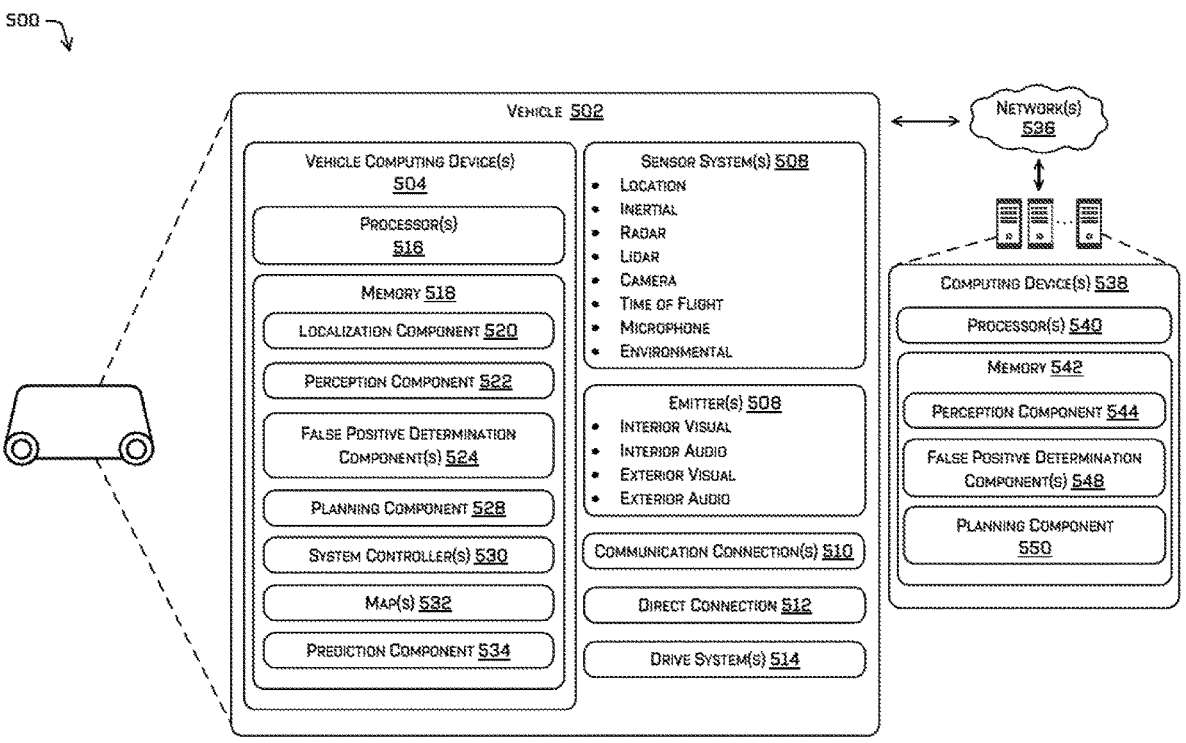
FIG. 5 is a block diagram of an example system for implementing the techniques described herein.

FIG. 4A is a perspective view of an example environment 400 in which a vehicle 402 may be traveling. The vehicle 402 may be configured with one or more sensor systems 404 that may include any one or more sensors of any type (e.g., lidar, radar, sonar, vision, time-of-flight, ultrasonic, infrared, etc.). The vehicle 402 may also be configured with a false positive determination system 406 that may receive sensor data from the sensor system(s) 404. The false positive determination system 406 may false positive determination operations as described herein and may provide the resulting true positive sensor detections and detection data to a vehicle computing system 408 for use in vehicle control operations. As shown in this example, the false positive determination system 406 may be configured with or at the sensor systems(s) 404, essentially filtering sensor data before providing the filtered sensor data to the vehicle computing system 408. Alternatively or additionally, the false positive determination system 406 may be configured at the vehicle computing system 408 for receiving sensor data from the sensor systems(s) 404 and filtering such data before use by other components of the vehicle computing system 408. In yet other examples, the false positive determination system 406 may be configured between the sensor systems(s) 404 and the vehicle computing system 408, processing sensor data from the sensor systems(s) 404 before providing filtered sensor data to the vehicle computing system 408.

As noted, the vehicle 402 may further be configured with the vehicle computing system 408 that may include one or more processors 410, a memory 412, a perception component 414, a planning component 416, and/or any other vehicle computing system component described herein, any one or more of which may be used to perform, or in conjunction with the performance of, one or more of the operations described herein.

The environment 400 may include a drivable region 418 on which the vehicle 402 may be traveling along with another vehicle 422. The environment 400 may also include a non-drivable region 420 (e.g., a sidewalk). The sensor system(s) 404 may collect data from the environment 400 (e.g., by receiving or otherwise sensing reflected and/or emitted electromagnetic waves in the environment 400) and generate sensor data that the sensor system(s) 404 may provide to the false positive determination system 406. This sensor data may take the form of two-dimensional data and/or three-dimensional data representing and/or otherwise associated with the environment 400. In examples, the sensor data may be radar detection data associated with a radar point cloud and/or lidar detection data associated with a lidar point cloud.

The false positive determination system 406 may process the sensor data as described herein to determine true and false positive detections represented in the sensor data. For example, the false positive determination system 406 may determine the difference between a primary array error (e.g., primary array MSE) and a secondary array error (e.g., secondary array MSE) for an individual radar detection and/or the difference between a primary error and a secondary error for an individual lidar detection. The system may then determine whether these one or more differences meet or exceed an error threshold value. If the one or more differences meet or exceed the error threshold value, the system may designate that individual detection as a true positive and/or otherwise associate that individual detection with a set of true positive detections. Otherwise, if the difference does not meet the error threshold value, the system may designate that individual detection as a false positive and/or otherwise associate that individual detection with a set of false positive detections.

The false positive determination system 406 may next process the set of false positive detections determined based on error differences to determine if any of such detections should be redesignated as true positive detections. For example, the false positive determination system 406 may compare individual radar detections in a set of false positive radar detections to the radar detections in the set of true positive radar detections to determine if the individual false positive radar detections sufficiently correlate to a threshold number of true positive radar detections (as described in more detail herein). Similar operations may be performed for lidar detections and/or any other types of detections. If an individual false positive detection sufficiently correlates to the threshold number of true positive detections, the false positive determination system 406 may redesignate that detection as a true positive detection and/or otherwise associate that individual detection with the set of true positive detections. The redesignated true positive detection can then be used for correlation operations for the remaining false positive detections. Otherwise, an individual false positive detection that does not sufficiently correlate to the threshold number of true positive detections may be removed for use in further operations and/or remain associated with the set of false positive detections.

The true positive detections determined by the false positive determination system 406 may then be provided to the vehicle computing system 408 and/or one of its components. For example, the true positive detections may be provided to the perception component 414 for perception and classification operations and/or to the planning component 416 for planning operations, including those described herein.

Figure 4B:
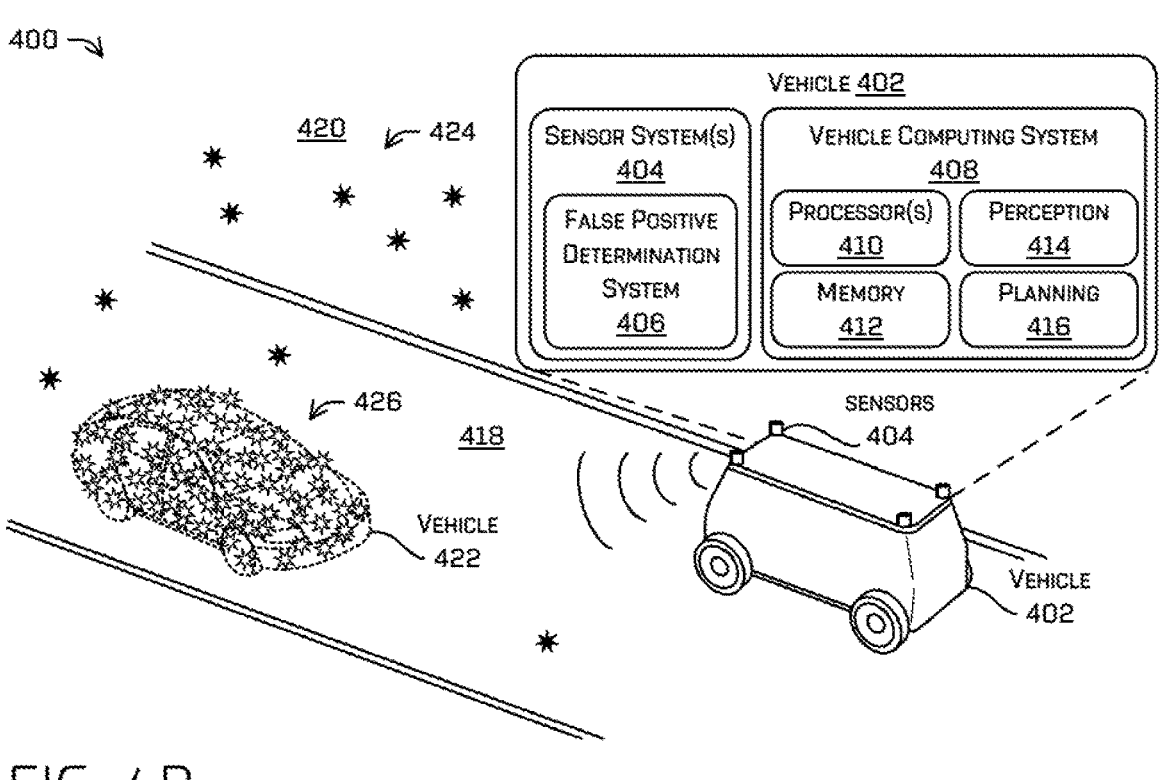
FIG. 4B is a diagram of the example environment of FIG. 4A in which the vehicle may determine false positive sensor data from sensor data collected in the environment for purposes of navigating the vehicle through the environment, in accordance with examples of the disclosure.

Referring now to FIG. 4B, the false positive determination system 406 may have determined a status for the detections generated by the sensor system(s) 404. For example, the black stars represented in the detections 424 may be detections of dynamic objects or surfaces that were determined to be false positive detections. These detections 424 may have been filtered from the sensor data provided by the false positive determination system 406 to the vehicle computing system 408. The white stars represented in the detections 426 may be detections of dynamic objects or surfaces that were determined to be true positive detections. As can be seen here, these detections are associated with the location of the vehicle 422. These detections 426 may have been included in the sensor data provided by the false positive determination system 406 to the vehicle computing system 408.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, one or more false positive determination components 524, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the false positive determination component(s) 524, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification, in addition to, or instead of, object detection and classification as described herein. For example, the perception component 522 may include functionality to analyze sensor data to determine how to label pixels. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, small, dynamic, non-impeding object, unknown). In examples, the perception component 522 may include the functionality of the false positive determination component(s) 524.

In additional or alternative examples, the perception component 522 can provide processed sensor data that indicates one or more characteristics associated with a detected entity (e.g., a tracked object) and/or the environment in which the entity is positioned. The perception component 522 may use multichannel data structures, such as voxel data structures and two-dimensional sensor data, to generate processed sensor data, which may take the form of two-dimensional images and/or three-dimensional representations in some examples. In examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a multichannel data structure, a two-dimensional grid of cells containing data, a two-dimensional representation of a portion of an environment from a sensor perspective, a two-dimensional image, a sensor data frame, point cloud representation, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment and can be loaded into working memory as needed. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, the false positive determination component(s) 524, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses as described herein to generate one or more predicted trajectories for various mobile objects in an environment. In some examples, the prediction component 534 may be a subcomponent of perception component 522.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers. Such a CNN may be a component of and/or interact with the various other components described herein.

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine false and/or true positive detection. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time-of-flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504 and, in examples, to the false positive determination component(s) 524. Alternatively or additionally, the sensor system(s) 506 can send sensor data, via the one or more networks 536, to the one or more computing device(s) 538 at a particular frequency and, in examples, to the false positive determination component(s) 548, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable region presence, and/or other data, including true positive and/or false positive status data described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, 6G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller that can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., images, labeled images, true positive detections, false positive detections, etc.) to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning component 550, a perception component 544, and/or one or more false positive determination components 548, that may be configured to perform one or more of the false positive determination operations described herein. In some instances, the perception component 544 can substantially correspond to the perception component 522 and can include substantially similar functionality. In some instances, the false positive determination component(s) 548 can substantially correspond to the false positive determination component(s) 524 and can include substantially similar functionality. In some instances, the planning component 550 can substantially correspond to the planning component 528 and can include substantially similar functionality.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples described herein.

A: A system comprising: one or more processors; and one or more non-transitory computer-readable media storing instructions executable by the one or more processors, wherein the instructions, when executed, cause the system to perform operations comprising: receiving radar data comprising a plurality of radar returns associated with a vehicle traversing an environment; determining, for a radar return of the plurality of radar returns, an error difference between a primary error associated with the radar return and a secondary error associated with the radar return; determining, based at least in part on the error difference, a set of false positive returns comprising a first subset of the plurality of radar returns and a set of true positive returns comprising a second subset of the plurality of radar returns that is distinct from the first subset; determining a correlation between a false positive return of the set of false positive returns and a true positive return of the set of true positive returns; associating, based at least in part on the correlation, the false positive return with the set of true positive returns; and controlling the vehicle based at least in part on the set of true positive returns and excluding the set of false positive returns.

B: The system of paragraph A, wherein the primary error is a primary angle of arrival error and the secondary error is a secondary angle of arrival error.

C: The system of paragraph A or B, wherein the correlations comprise one or more of: a first correlation between an error difference of the false positive return and an error difference of the true positive return, a second correlation between a position coordinate of the false positive return and a position coordinate of the true positive return, or a third correlation between a velocity of the false positive return and a velocity of the true positive return.

D: The system of any of paragraphs A-C, wherein controlling the vehicle comprises: detecting an object represented in the set of true positive returns; and controlling the vehicle based at least in part on the object.

E: The system of any of paragraphs A-D, wherein determining the set of true positive returns comprises determining that an error difference for a return of the set of true positive returns meets or exceeds an error difference threshold.

F: One or more non-transitory computer-readable media storing instructions that, when executed by one or more processors, perform operations comprising: receiving data comprising a plurality of measurements associated with a vehicle operating in an environment; determining, for a measurement of the plurality of measurements, a difference between a primary measurement parameter and a secondary measurement parameter; determining, based at least in part on the difference, a set of false positive measurements and a set of true positive measurements; determining a correlation between a false positive measurement of the set of false positive measurements and a true positive measurement of the set of true positive measurements; adding, based at least in part on the correlation, the false positive measurement to the set of true positive measurements; and controlling the vehicle based at least in part on the set of true positive measurements and excluding the set of false positive measurements.

G: The one or more non-transitory computer-readable media of paragraph F, wherein the correlation is one of a set of correlations between the false positive measurement of the set of false positive measurements and additional measurements of the set of true positive measurements, and wherein adding the false positive measurement to the set of true positive measurements comprises determining that at least a threshold number of correlations of the set of correlations meet or exceed a threshold correlation value.

H: The one or more non-transitory computer-readable media of paragraphs F or G, wherein adding the false positive measurement to the set of true positive measurements comprises determining that a correlation of a parameter of the false positive measurement with a parameter of the true positive measurement meets or exceeds a correlation threshold.

I: The one or more non-transitory computer-readable media of any of paragraphs F-H, wherein determining the set of false positive measurements comprises determining that the difference falls below a difference threshold.

J: The one or more non-transitory computer-readable media of any of paragraphs F-I, wherein controlling the vehicle comprises: generating a representation of the environment based at least in part on the set of true positive measurements; and controlling the vehicle using the representation.

K: The one or more non-transitory computer-readable media of any of paragraphs F-J, wherein controlling the vehicle comprises: determining a classification for an object in the environment based at least in part on the set of true positive measurements; and controlling the vehicle based at least on the classification.

L: The one or more non-transitory computer-readable media of any of paragraphs F-K, wherein one of the primary measurement parameter or the secondary measurement parameter comprises one of: a lidar power parameter, a lidar reflectivity parameter, a position parameter, a primary angle of arrival error parameter, a secondary angle of arrival error parameter, a velocity parameter, an elevation parameter, or an azimuth parameter.

M: The one or more non-transitory computer-readable media of any of paragraphs F-L, wherein the data comprises one of lidar data or radar data.

N: The one or more non-transitory computer-readable media of any of paragraphs F-M, wherein the primary measurement parameter is a primary mean squared error of angle of arrival and the secondary measurement parameter is a secondary mean squared error of angle of arrival.

O: A method comprising: receiving data comprising a plurality of detections associated with a vehicle traversing an environment; determining, for a detection of the plurality of detections, a difference between a primary detection parameter and a secondary detection parameter; determining, based at least in part on the difference, a first set of detections and a second set of detections; determining a correlation between a first detection of the first set of detections and a second detection of the second set of detections; modifying, based at least in part on the correlation, the first detection to be associated with the second set of detections; and controlling the vehicle based at least in part on the second set of detections and excluding the first set of detections.

P: The method of paragraph O, wherein the primary detection parameter is a primary confidence value and the secondary detection parameter is a secondary confidence value.

Q: The method of paragraph O or P, wherein determining the second set of detections comprises determining the difference meets or exceeds a difference threshold.

R: The method of any of paragraphs O-Q, wherein modifying the first detection comprises determining the correlation meets or exceeds a correlation threshold.

S: The method of any of paragraphs O-R, wherein controlling the vehicle is further based at least in part on second data comprising a fusion of the second set of detections with a third set of detections associated with a first sensor system.

T: The method of paragraph S, wherein: the first sensor system comprises a first type of sensor; and the second set of detections is received from a second sensor system comprising a second type of sensor that is distinct from the first type of sensor.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving radar data comprising a plurality of radar returns associated with a vehicle traversing an environment;
      determining, for a radar return of the plurality of radar returns, an error difference between a primary error associated with the radar return and a secondary error associated with the radar return;
      determining, based at least in part on the error difference, a set of false positive returns comprising a first subset of the plurality of radar returns and a set of true positive returns comprising a second subset of the plurality of radar returns that is distinct from the first subset;
      determining a correlation between a false positive return of the set of false positive returns and a true positive return of the set of true positive returns;
      associating, based at least in part on the correlation, the false positive return with the set of true positive returns; and
      controlling the vehicle based at least in part on the set of true positive returns and excluding the set of false positive returns.

2. The system of claim 1, wherein the primary error is a primary angle of arrival error and the secondary error is a secondary angle of arrival error.

3. The system of claim 1, wherein the correlations comprise one or more of:

a first correlation between an error difference of the false positive return and an error difference of the true positive return, a second correlation between a position coordinate of the false positive return and a position coordinate of the true positive return, or a third correlation between a velocity of the false positive return and a velocity of the true positive return.

4. The system of claim 1, wherein controlling the vehicle comprises:
   detecting an object represented in the set of true positive returns; and
   controlling the vehicle based at least in part on the object.

5. The system of claim 1, wherein determining the set of true positive returns comprises determining that an error difference for a return of the set of true positive returns meets or exceeds an error difference threshold.

6. One or more non-transitory computer-readable media storing instructions that, when executed by one or more processors, perform operations comprising:
   receiving data comprising a plurality of measurements associated with a vehicle operating in an environment;
   determining, for a measurement of the plurality of measurements, a difference between a primary measurement parameter and a secondary measurement parameter;
   determining, based at least in part on the difference, a set of false positive measurements and a set of true positive measurements;
   determining a correlation between a false positive measurement of the set of false positive measurements and a true positive measurement of the set of true positive measurements;
   adding, based at least in part on the correlation, the false positive measurement to the set of true positive measurements; and
   controlling the vehicle based at least in part on the set of true positive measurements and excluding the set of false positive measurements.

7. The one or more non-transitory computer-readable media of claim 6, wherein the correlation is one of a set of correlations between the false positive measurement of the set of false positive measurements and additional measurements of the set of true positive measurements, and
   wherein adding the false positive measurement to the set of true positive measurements comprises determining that at least a threshold number of correlations of the set of correlations meet or exceed a threshold correlation value.

8. The one or more non-transitory computer-readable media of claim 6, wherein adding the false positive measurement to the set of true positive measurements comprises determining that a correlation of a parameter of the false positive measurement with a parameter of the true positive measurement meets or exceeds a correlation threshold.

9. The one or more non-transitory computer-readable media of claim 6, wherein determining the set of false positive measurements comprises determining that the difference falls below a difference threshold.

10. The one or more non-transitory computer-readable media of claim 6, wherein controlling the vehicle comprises:
   generating a representation of the environment based at least in part on the set of true positive measurements; and
   controlling the vehicle using the representation.

11. The one or more non-transitory computer-readable media of claim 6, wherein controlling the vehicle comprises:

determining a classification for an object in the environment based at least in part on the set of true positive measurements; and controlling the vehicle based at least on the classification.

12. The one or more non-transitory computer-readable media of claim 6, wherein one of the primary measurement parameter or the secondary measurement parameter comprises one of:

a lidar power parameter, a lidar reflectivity parameter, a position parameter, a primary angle of arrival error parameter, a secondary angle of arrival error parameter, a velocity parameter, an elevation parameter, or an azimuth parameter.

13. The one or more non-transitory computer-readable media of claim 6, wherein the data comprises one of lidar data or radar data.

14. The one or more non-transitory computer-readable media of claim 6, wherein the primary measurement parameter is a primary mean squared error of angle of arrival and the secondary measurement parameter is a secondary mean squared error of angle of arrival.

15. A method comprising:

receiving data comprising a plurality of detections associated with a vehicle traversing an environment;

determining, for a detection of the plurality of detections, a difference between a primary detection parameter and a secondary detection parameter;

determining, based at least in part on the difference, a first set of detections and a second set of detections;

determining a correlation between a first detection of the first set of detections and a second detection of the second set of detections;

modifying, based at least in part on the correlation, the first detection to be associated with the second set of detections; and controlling the vehicle based at least in part on the second set of detections and excluding the first set of detections.

16. The method of claim 15, wherein the primary detection parameter is a primary confidence value and the secondary detection parameter is a secondary confidence value.

17. The method of claim 15, wherein determining the second set of detections comprises determining the difference meets or exceeds a difference threshold.

18. The method of claim 15, wherein modifying the first detection comprises determining the correlation meets or exceeds a correlation threshold.

19. The method of claim 15, wherein controlling the vehicle is further based at least in part on second data comprising a fusion of the second set of detections with a third set of detections associated with a first sensor system.

20. The method of claim 19, wherein:

the first sensor system comprises a first type of sensor; and the second set of detections is received from a second sensor system comprising a second type of sensor that is distinct from the first type of sensor.

*    *    *    *    *